Feb. 6, 1962  W. R. McKEON  3,020,523
AUTO KEY REMINDER
Filed June 13, 1960

INVENTOR.
WILLIAM R. McKEON
BY
Carl Miller
ATTORNEY

United States Patent Office 3,020,523
Patented Feb. 6, 1962

3,020,523
AUTO KEY REMINDER
William R. McKeon, 135–37 94th St., Ozone Park, N.Y.
Filed June 13, 1960, Ser. No. 35,785
3 Claims. (Cl. 340—52)

This invention relates to automobiles and, more particularly, to an accessory therefor.

Very often the driver of a vehicle will leave the vehicle with the ignition turned on. This is not only a dangerous condition, but also unnecessarily wastes fuel and overheats the engine. It is therefore an object of the present invention to provide an accessory for automotive vehicles which will overcome the aforementioned difficulties, in a simple and convenient manner.

Still another object of the present invention is to provide an accessory for automotive vehicles of the type described which can be readily installed on all existing vehicles, used on new model vehicles, and which can be mounted without damaging or interfering with the dashboard instruments of the vehicle.

Still another object of the present invention is to provide a key reminder device of the above type which will emit an audible signal in the event that the driver of the vehicle attempts to leave with the key turned on.

An additional object of the present invention is to provide a key reminder for automotive vehicles which will effectively prevent the driver from locking himself out of the vehicle, avoid possible theft of the vehicle, and which will avoid payment of fines for leaving an unattended vehicle without removing the ignition key, and which will further avoid overheating of the engine resulting from allowing the engine to idle for prolonged periods of time with the driver of the vehicle absent.

Figure 1:
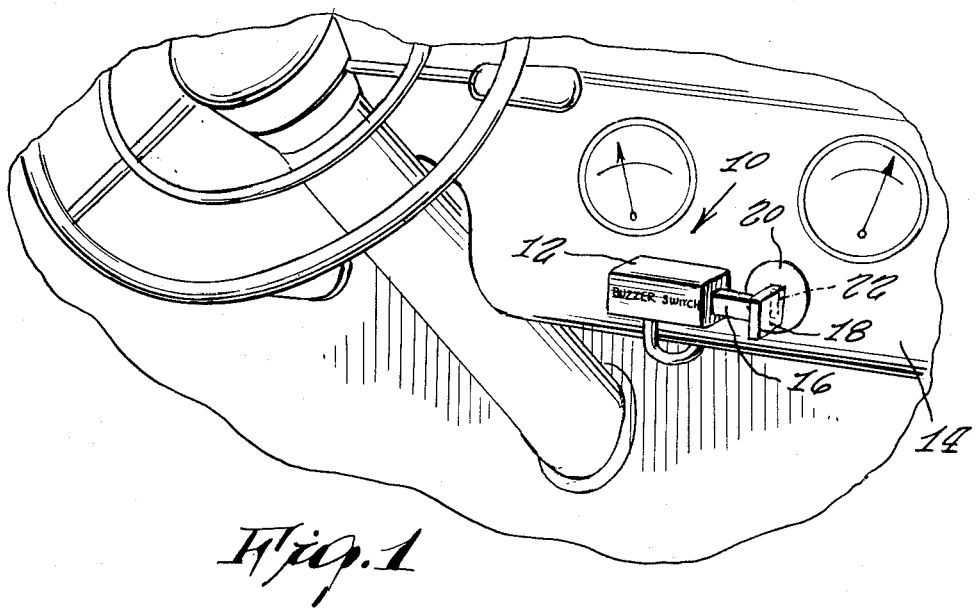
Figure 2:
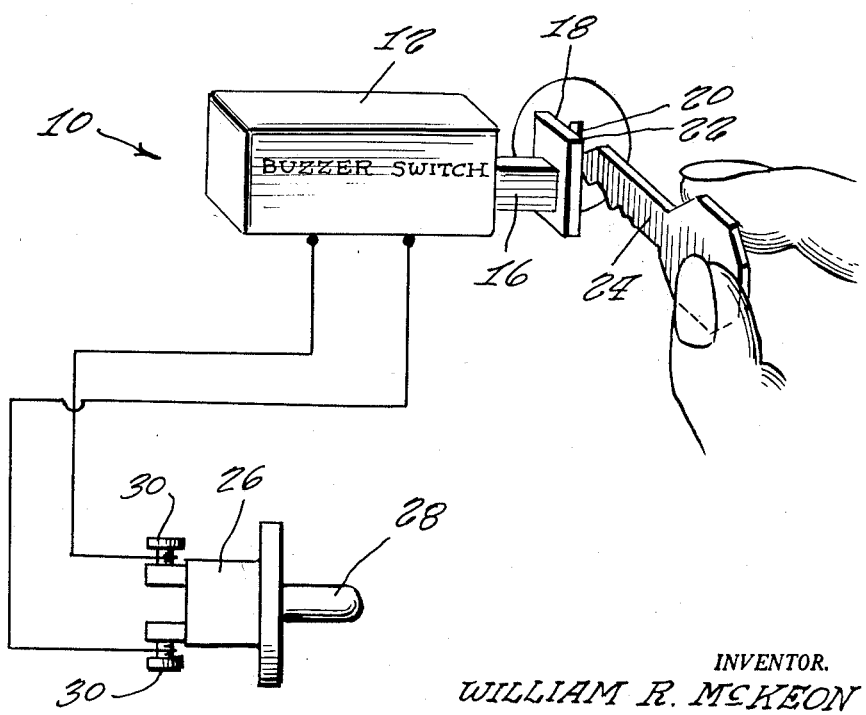

All of the foregoing and still further objects and advantages of this invention will become apparent from a study of the following specification, taken in connection with the accompanying drawing, wherein:

FIGURE 1 is a perspective view of a device made in accordance with the present invention in actual use showing the parts in the released position when the vehicle ignition key is withdrawn; and FIGURE 2 is a perspective schematic wiring diagram of the operating parts of the present invention showing the position of the parts when the ignition key is inserted.

Referring now to the drawing, an automotive vehicle accessory 10 made in accordance with the present invention is shown to include a main housing 12 which can be conveniently mounted upon the dashboard 14 of the vehicle in any suitable manner, such as by a permanent magnet mounted upon the back wall of the housing.

A plunger 16 is slidably supported within the main housing 12 for reciprocating longitudinal movement, and includes an outwardly facing face plate 18 that is normally disposed in blocking relationship over the slot 22 of the ignition key lock 20 into which the ignition key 24 is inserted. This plunger 16 controls a normally open electrical switch that is connected in series with an audible signal device within the housing 12, which signal device and first switch are connected in series with the second normally closed switch 26 having a push button type actuator 28. This circuit is energized by connecting a pair of lead wires from another accessory of the automobile to the mounting terminals 30 on the second push button switch 26.

The second switch 26 is mounted within a door frame of the vehicle, so that with all of the doors of the vehicle closed, the switch 26 will be opened by the depression of the push button 28. Thus, so long as the door is closed, whether or not the key 24 is in the ignition lock, the audible signal device will remain deenergized. However, with the key 24 inserted into the lock, whether rotated to the ignition-on position or not, so that the first switch within the housing 12 is in a closed position, the opening of the door associated with the second switch 26, will cause the electrical circuit through the switches to be closed by the outward movement of the spring biased plunger 28, thus energizing the audible signal and emitting a warning to the driver of the vehicle to remove the ignition key.

It will now be recognized that this device can be readily installed on all types of existing vehicles, as well as new production models, with a minimum of expense, inconvenience, and with no damage to the vehicle parts.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An automotive vehicle ignition accessory comprising, in combination, a main housing, an electrically responsive signal device, said device being mounted within said main housing, a first normally open switch mounted within said main housing, said first normally open switch being connected in series with said signal device, a second normally closed switch connected in series with said first switch and said signal device being mounted within a door frame of the vehicle, a source of electrical energy connected in circuit relationship with said first and second switches of said signal device, a key sensing device carried by said housing adjacent to the ignition lock for closing said first switch in response to the insertion of an ignition key to the ignition lock, said second switch closing an electrical circuit through said signal device in response to the opening of said door with said ignition key in said locked position, said electrically responsive signal device comprising an audible signal buzzer, said second normally closed switch comprising a push button having a plunger normally biased outwardly toward an extended position, and said push button being disposed in the path of movement of the vehicle door for movement inwardly to open said second switch in response to the closing of the vehicle door.

2. An automotive vehicle accessory as set forth in claim 1, wherein said key sensing device comprises a plunger slidably carried by said housing having a face plate normally overlying the key slot of the ignition lock, whereby insertion of an ignition key is operative to effect longitudinal movement of said plunger inwardly of said housing to close said normally open first switch.

3. An automotive vehicle accessory as set forth in claim 2, further permanent magnet mounting means integral with said housing for releasable mounting engagement upon the dashboard of the vehicle adjacent to the ignition switch thereof.

References Cited in the file of this patent
UNITED STATES PATENTS

| | | |
|---|---|---|
| 2,613,258 | Azano | Oct. 7, 1952 |
| 2,847,656 | Ricks | Aug. 12, 1958 |
| 2,943,308 | Westphal | June 28, 1960 |

FOREIGN PATENTS

| | | |
|---|---|---|
| 342,506 | Great Britain | Feb. 5, 1931 |